(12) United States Patent
Witlicki

(10) Patent No.: US 11,761,352 B2
(45) Date of Patent: Sep. 19, 2023

(54) CARBON SEAL SPRING RETENTION

(71) Applicant: Raytheon Technologies Corporation, Farmington, CT (US)

(72) Inventor: Russell B. Witlicki, Wethersfield, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 8 days.

(21) Appl. No.: 16/933,739

(22) Filed: Jul. 20, 2020

(65) Prior Publication Data
US 2020/0347750 A1 Nov. 5, 2020

Related U.S. Application Data

(63) Continuation of application No. 15/402,559, filed on Jan. 10, 2017, now Pat. No. 10,718,234.

(51) Int. Cl.
F01D 25/24 (2006.01)
F01D 25/16 (2006.01)
(Continued)

(52) U.S. Cl.
CPC .......... F01D 25/246 (2013.01); F01D 11/003 (2013.01); F01D 25/162 (2013.01);
(Continued)

(58) Field of Classification Search
CPC . F01D 11/003; F01D 9/02; F01D 9/04; F01D 9/041; F01D 25/162; F01D 25/246; F01D 25/243; F01D 11/005; F02C 7/28; F05D 2220/32; F05D 2240/55; F05D 2260/52; F05D 2260/38; F16J 15/3436; F16J 15/3452; F16J 15/3464;
(Continued)

(56) References Cited

U.S. PATENT DOCUMENTS 1,390,948 A * 9/1921 Woodward ................ B60C 7/18
152/105
2,817,309 A * 12/1957 Wittlin .................. G01P 13/008
116/276
(Continued)

FOREIGN PATENT DOCUMENTS

CA 1018202 A 9/1977
EP 1186813 A1 3/2002

OTHER PUBLICATIONS

Extended European Search Report dated Jun. 6, 2018, for corresponding European Application No. 18150902.7.

Primary Examiner — Devon C Kramer
Assistant Examiner — Joseph S. Herrmann
(74) Attorney, Agent, or Firm — Kinney & Lange, P.A.

(57) ABSTRACT

A seal assembly for a turbine engine extends along a center axis and includes a seal support and a seal carrier configured to translate relative the seal support. A seal is connected to the seal carrier and a spring is disposed between the seal support and the seal carrier. A spring carrier is disposed between the spring and the seal support. A first end of the spring is connected to the spring carrier and the spring carrier is connected to the seal support. The spring includes a second end disposed opposite the first end of the spring. The second end of the spring contacts the annular seal carrier.

10 Claims, 8 Drawing Sheets

(51) Int. Cl.
*F01D 11/00* (2006.01)
*F16J 15/34* (2006.01)
*F02C 7/28* (2006.01)

(52) U.S. Cl.
CPC ............. *F02C 7/28* (2013.01); *F16J 15/3436* (2013.01); *F16J 15/3452* (2013.01); *F16J 15/3464* (2013.01); *F16J 15/3472* (2013.01); *F05D 2220/32* (2013.01); *F05D 2240/55* (2013.01); *F05D 2260/52* (2013.01)

(58) Field of Classification Search
CPC ... F16J 15/3472; F04D 29/083; F04D 29/102; F04D 29/122; F16F 1/12; F16F 1/125; F16F 1/126; F16F 1/128; F16F 3/04
USPC .......................... 277/377, 379, 385; 267/179
See application file for complete search history.

(56) References Cited

U.S. PATENT DOCUMENTS

| | | | | |
|---|---|---|---|---|
| 3,584,887 A | * | 6/1971 | Brown | F16J 15/38 |
| | | | | 277/385 |
| 4,549,859 A | * | 10/1985 | Andrione | F04B 39/127 |
| | | | | 248/624 |
| 4,807,859 A | * | 2/1989 | Bolthouse | B30B 15/02 |
| | | | | 267/179 |
| 7,736,122 B1 | * | 6/2010 | Stone | F01D 11/003 |
| | | | | 415/1 |
| 7,749,187 B2 | * | 7/2010 | Lindmayer | A61M 5/30 |
| | | | | 604/218 |
| 8,181,966 B2 | * | 5/2012 | Haynes | F16J 15/3452 |
| | | | | 277/371 |
| 10,718,234 B2 | * | 7/2020 | Witlicki | F02C 7/28 |
| 2010/0201074 A1 | | 8/2010 | Haynes et al. | |
| 2014/0062026 A1 | * | 3/2014 | Davis | F16J 15/3436 |
| | | | | 277/358 |
| 2015/0337674 A1 | | 11/2015 | Sonokawa et al. | |
| 2016/0032840 A1 | * | 2/2016 | James | F01D 11/003 |
| | | | | 415/170.1 |

* cited by examiner

CARBON SEAL SPRING RETENTION

BACKGROUND

The present invention relates to gas turbine engines, and more specifically to seals for use in turbine sections of gas turbine engines.

Carbon seal assemblies are used in gas turbine engines along rotating shafts to maintain lubricating fluids within bearing compartments and to seal compartments against hot air intrusion or cooling air leakage. Some carbon seal assemblies include spring-loaded carriers to hold and push carbon seals against sealing surfaces. In some engines, the carbon seal assembly is bolted to a forward end of the bearing compartment before the bearing compartment is assembled into the engine. Periodically, the carbon seal in the assembly requires replacement and operators often must disassemble the whole bearing compartment to access the carbon seal assembly.

The alternative to disassembling the entire bearing compartment to reach the carbon seal assembly is to remove a bearing assembly inside the bearing compartment to remove the carrier holding the carbon seal. However, as the carrier is removed from the rest of the carbon seal assembly, the springs in the carbon seal assembly may fall out of place. After the carbon seal on the carrier has been replaced, the operator must ensure that all of the springs are placed back into position before the operator blindly positions the carrier back into place over the springs. Blindly placing the carrier into position is a very difficult task because the operator must take care that the springs do not fall out of place again.

SUMMARY

In one embodiment, a seal assembly for a turbine engine extends along a center axis and includes an annular seal support arranged circumferentially around the center axis. An annular seal carrier is arranged circumferentially around the center axis, and an annular seal is connected to the seal carrier and arranged circumferentially around the center axis. A spring is disposed between the annular seal support and the annular seal carrier. A spring carrier is disposed between the spring and the annular seal support. A first end of the spring is connected to the spring carrier and the spring carrier is connected to the annular seal support.

In another embodiment, a gas turbine engine includes a mid-turbine frame arranged circumferentially around a center axis of the gas turbine engine. A bearing support is disposed radially inward from the mid-turbine frame and is connected to the mid-turbine frame. A bearing assembly is disposed radially inward of the bearing support. The gas turbine engine also includes a seal assembly. The seal assembly includes an annular seal support that is arranged circumferentially around the center axis and connected to the bearing support. An annular seal carrier is arranged circumferentially around the center axis and positioned axially between the annular seal support and the bearing assembly. An annular seal is connected to the seal carrier. The annular seal extends from the annular seal carrier towards the bearing assembly. A spring is disposed between the annular seal support and the annular seal carrier. A spring carrier is disposed between the spring and the annular seal support. A first end of the spring is connected to the spring carrier, and the spring carrier is connected to the annular seal support.

In another embodiment, a seal assembly for a turbine engine extends along a center axis and includes a seal support and a seal carrier configured to translate relative the seal support. A seal is connected to the seal carrier and a spring is disposed between the seal support and the seal carrier. A spring carrier is disposed between the spring and the seal support. A first end of the spring is connected to the spring carrier and the spring carrier is connected to the seal support. The spring includes a second end disposed opposite the first end of the spring. The second end of the spring contacts the annular seal carrier.

Persons of ordinary skill in the art will recognize that other aspects and embodiments are possible in view of the entirety of the present disclosure, including the accompanying figures.

BRIEF DESCRIPTION OF THE DRAWINGS

FIG. 6b is a cross-sectional view of the seal support, the spring carrier, and the spring from FIG. 6a.

Figure 1:
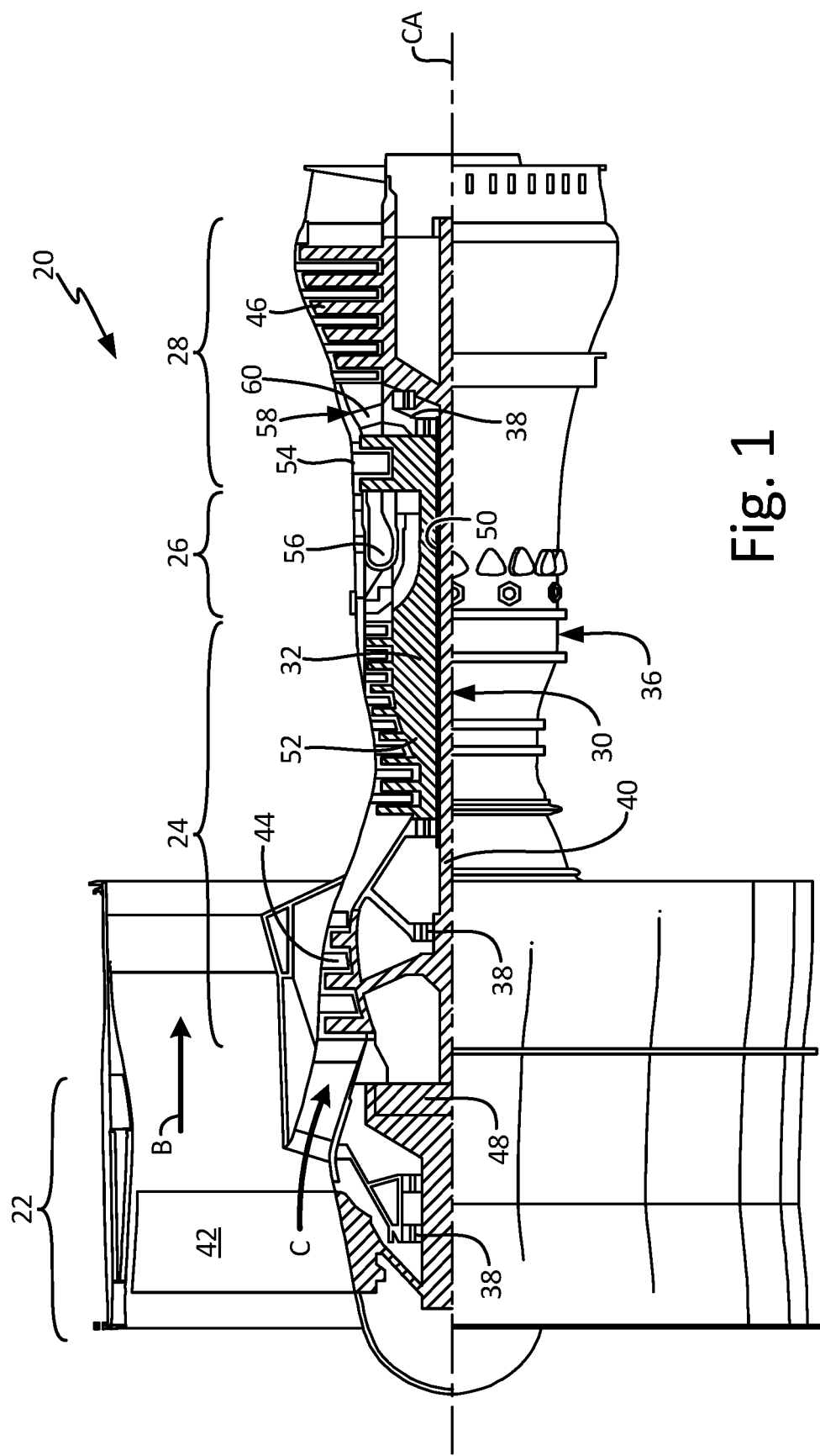
FIG. 1 is a partial cross-sectional view of a gas turbine engine.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The invention relates to a spring-loaded seal assembly in a gas turbine engine. The seal assembly includes a stationary seal support, a translatable seal carrier, a number of springs that press the seal carrier away from the seal support, and a spring carrier that connects the springs to the seal support. In many cases, the seal assembly is disposed within a tightly confined bearing compartment that does not provide a clear line of vision for an operator during service events. With the springs connected to the seal support by the spring carrier, an operator can remove the seal carrier from the seal assembly without the springs falling from their proper position in the assembly and getting lost in the gas turbine engine. Furthermore, the operator is able to blindly reattach the seal carrier to the seal assembly over the springs because the spring carrier keeps the springs in position. Because the operator is able to blindly reassemble the seal carrier to the rest of the seal assembly inside the bearing compartment, the operator does not have to go through the extra time and effort to disassemble the entire bearing compartment to service the seal assembly.

FIG. 1 is a quarter-sectional view that schematically illustrates example gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing assemblies 38 about center axis CA.

Figure 2:
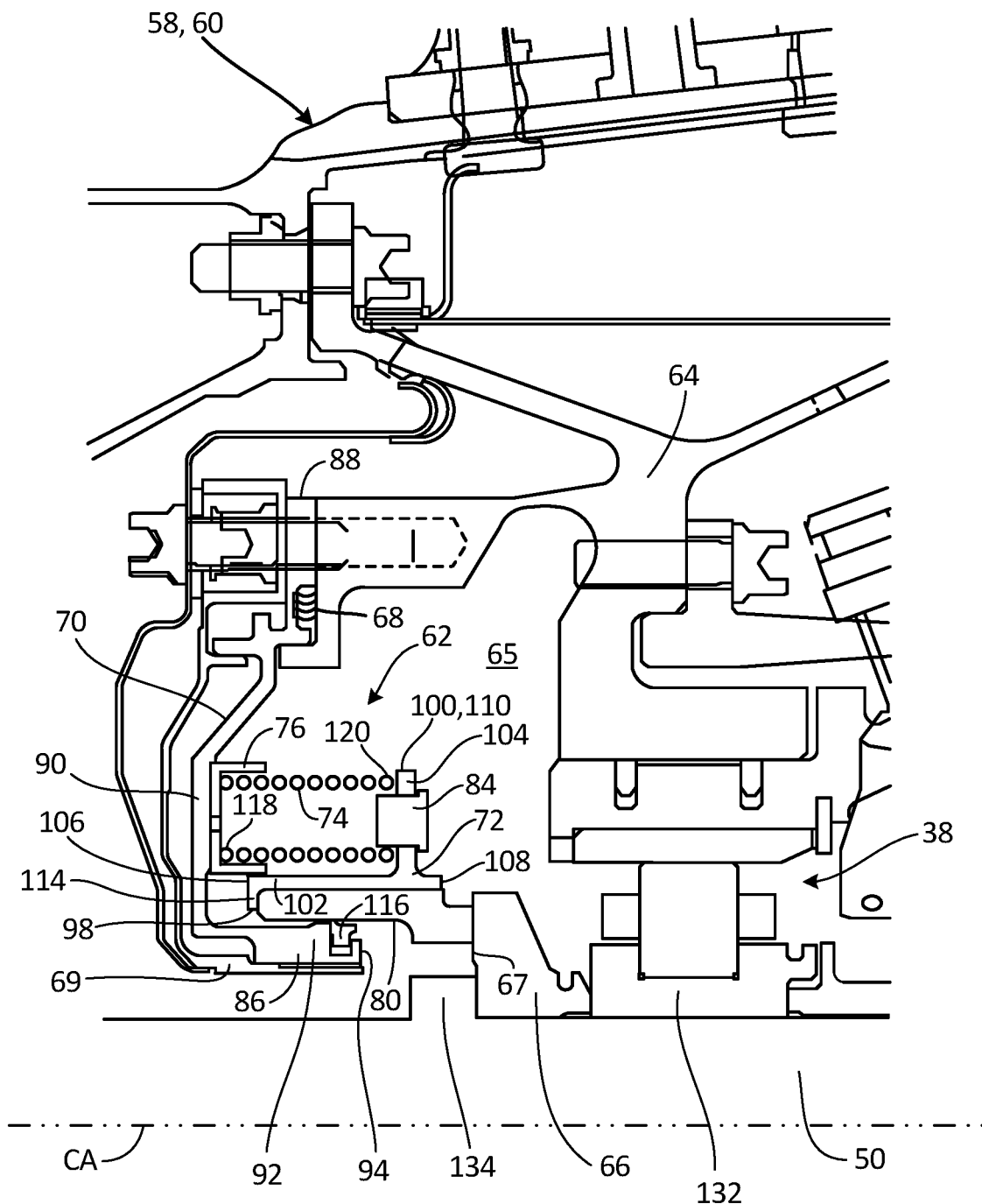
FIG. 2 is a cross-sectional view of a mid-turbine frame, a bearing support, a bearing assembly, and a seal assembly.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46. Mid-turbine frame 58 includes vanes 60, which are in the core airflow path and function as an inlet guide vane for low pressure turbine 46. The core airflow C is compressed first by low pressure compressor 44 and then by high pressure compressor 52 mixed with fuel and ignited in combustor 56 to produce high speed exhaust gases that are then expanded through high pressure turbine 54, mid-turbine frame 58, and low pressure turbine 46. As shown in FIGS. 2-3c, gas turbine engine 20 includes seal assembly 62 to reduce or eliminate air and fluid leakage across bearing assembly 38 at mid-turbine frame 58.

FIGS. 2-3c will be discussed concurrently. While FIGS. 2-3c are discussed concurrently and all of the numbered elements discussed below can be found in at least one of FIGS. 2-3c, not all of the numbered elements discussed below are shown in each of FIGS. 2-3c. In addition to seal assembly 62, gas turbine engine 20 also includes bearing assembly 38, bearing support 64, seal seat 66 with seat seal surface 67, and interface seal element 68. FIG. 2 is a cross-sectional view of mid-turbine frame 58, bearing support 64, bearing assembly 38, and seal assembly 62. Seal assembly 62 includes seal support 70, seal carrier 72, springs 74, spring carrier 76, torque pins 78, seal element 80, stopper collars 82, and spring pins 84.

Figure 3A:
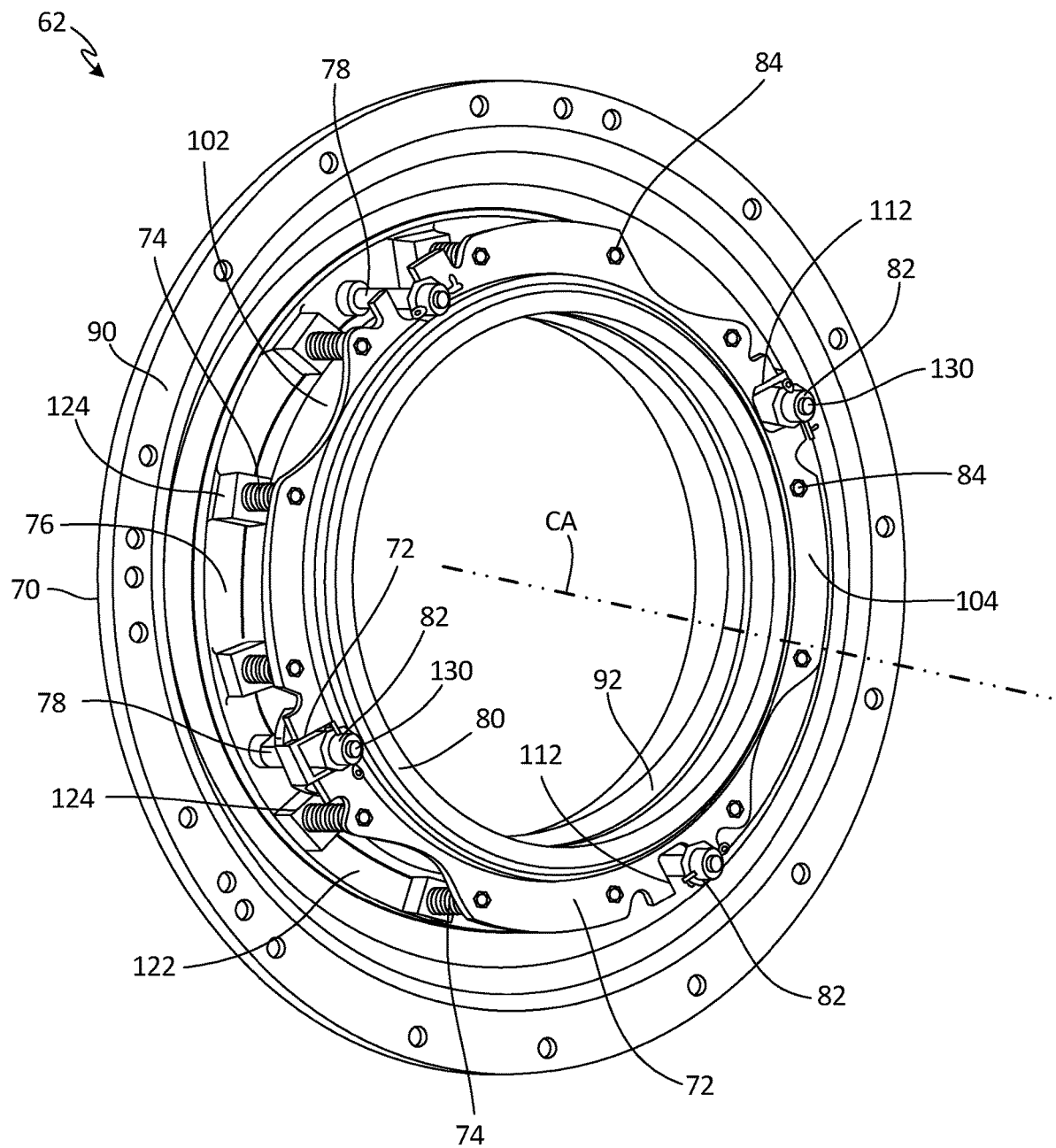
FIG. 3a is a perspective view of the seal assembly from FIG. 2.
Figure 3B:
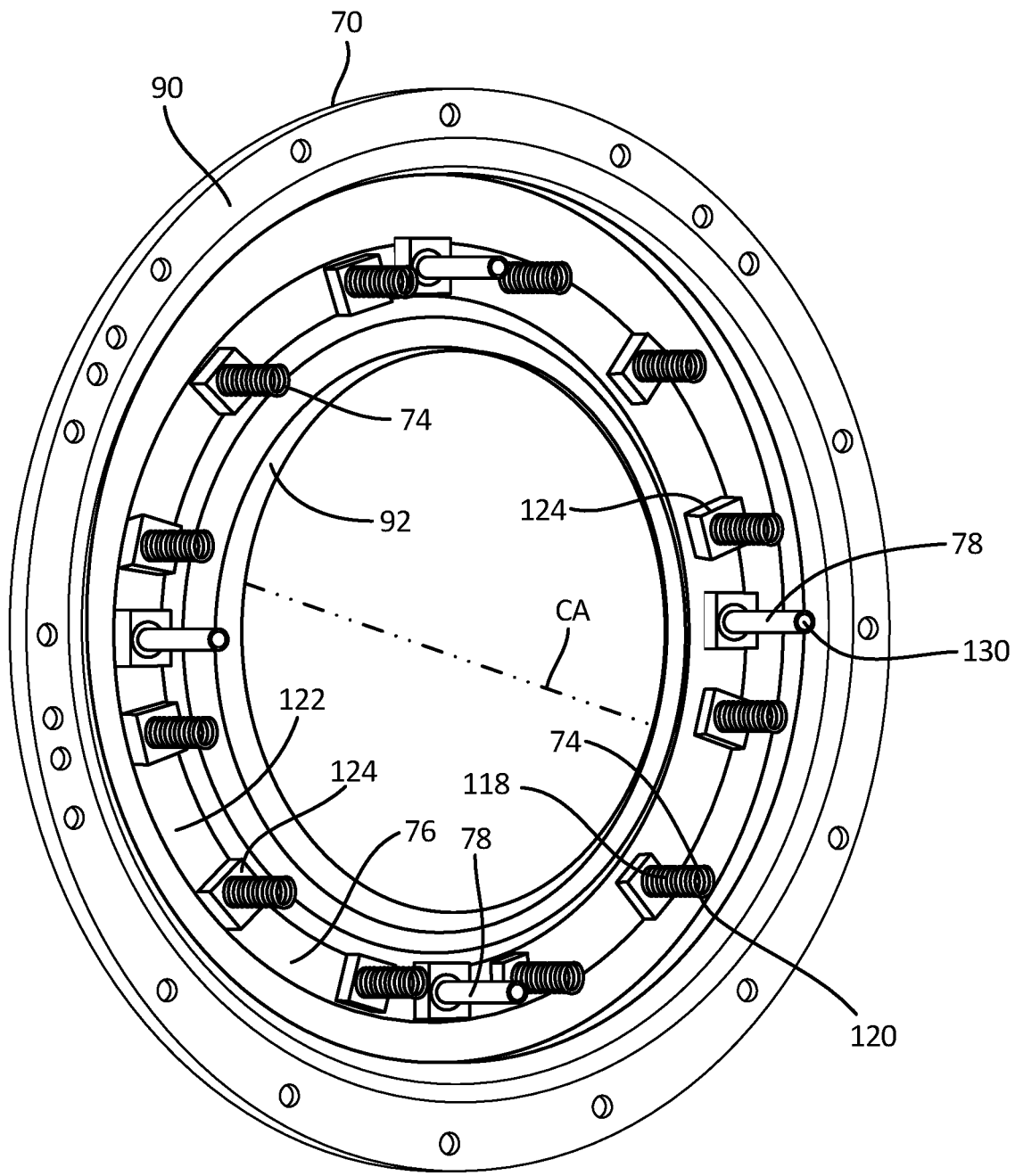
FIG. 3b is a perspective view of the seal assembly from FIG. 3a with a seal carrier and seal removed from the seal assembly.
Figure 3C:
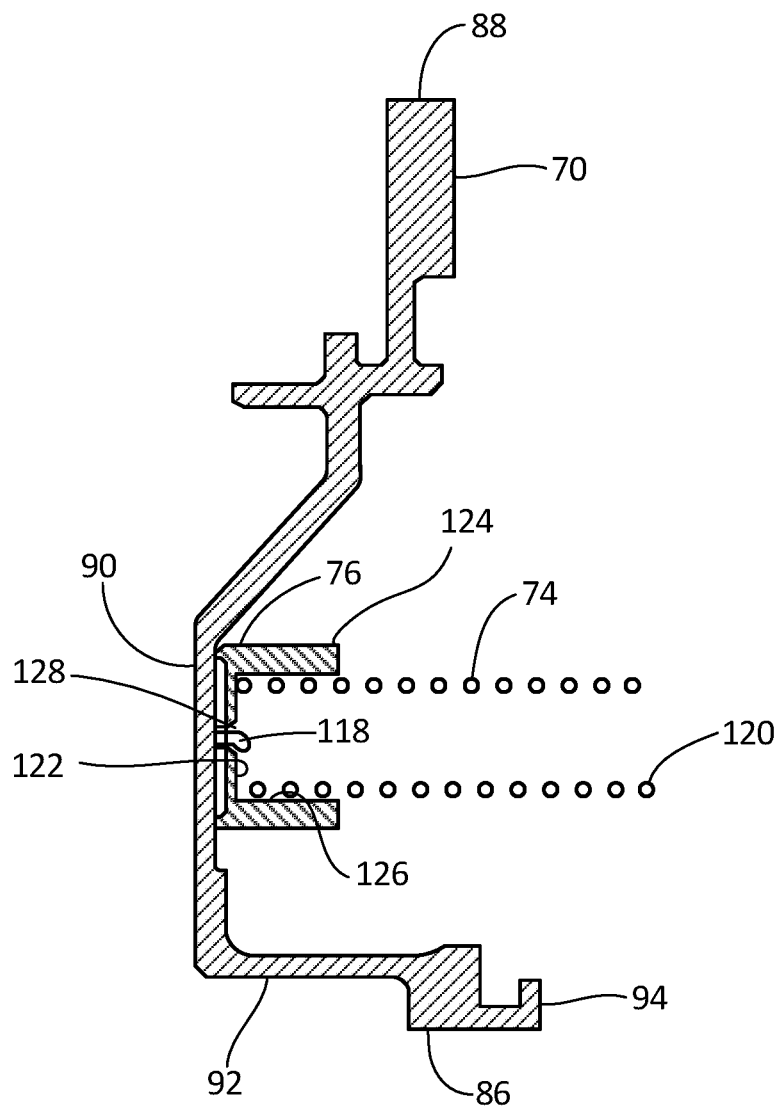
FIG. 3c is a cross-sectional view of a seal support, a spring carrier, and a spring from the seal assembly of FIG. 3b.

FIG. 3a is a perspective view of seal assembly 62 and FIG. 3b is a perspective view of seal assembly 62 from FIG. 3a with seal carrier 72 and seal element 80 removed from seal assembly 62. FIG. 3c is a cross-sectional view of seal support 70, spring carrier 76, and spring 74 from seal assembly 62 shown in FIG. 3b. Seal support 70 includes inner support side 86, outer support side 88, first support segment 90, second support segment 92, and distal segment end 94. Seal carrier 72 includes inner carrier side 98, outer carrier side 100, carrier sleeve, 102, carrier flange 104, first carrier end 106, second carrier end 108, distal flange end 110, slots 112, retainer flange 114, and second seal element 116. Each of springs 74 includes first end 118 and second end 120. The embodiment of spring carrier 76 in FIGS. 2-3c includes disc 122, bosses 124, and cavities 126 with hole 128 formed in the bottom of each of cavities 126. Torque pins 78 each include distal pin end 130. Bearing assembly 38 includes bearing inner race 132. Outer shaft 50 includes shaft shoulder 134.

As shown in FIGS. 2-3c, bearing support 64 is disposed radially between mid-turbine frame 58 and outer shaft 50 and forms bearing compartment 65 that houses bearing assembly 38. Bearing assembly 38 is disposed radially between bearing support 64 and outer shaft 50. Seal seat 66 is mounted onto outer shaft 50 between inner race 132 and shaft shoulder 134. Seal assembly 62 is mounted to a forward end of bearing support 64 and closes bearing compartment 65 by closing a radial gap between bearing support 64. Seal assembly 62 reduces or eliminates airflow and/or fluid leakage from bearing compartment 65.

Seal support 70 of seal assembly 62 is mounted to bearing support 64 and connects seal assembly 62 to bearing support 64. Seal support 70 extends radially between radial inner support side 86 and radial outer support side 88. First support segment 90 of seal support 70 extends radially inward from outer support side 88 to second support segment 92. First support segment 90 is connected to bearing support 64 with, for example, a plurality of fasteners (e.g., bolts). Annular interface seal element 68 is disposed axially between first support segment 90 of seal support 70 and bearing support 64 to reduce or prevent fluid leakage therebetween. Second support segment 92 is arranged at (e.g., adjacent or proximate to) inner support side 86. Second support segment 92 extends axially from first support segment 90 to distal segment end 94.

Seal carrier 72 is disposed axially between first support segment 90 and seal seat 66, and disposed circumferentially around second support segment 92. Seal carrier 72 extends radially between radial inner carrier side 98 and radial outer carrier side 100. Carrier sleeve 102 of seal carrier 72 is arranged at inner carrier side 98. Carrier sleeve 102 extends axially between first carrier end 106 and second carrier end 108. Carrier flange 104 of seal carrier 72 is arranged proximate second carrier end 108. Carrier flange 104 extends radially out from carrier sleeve 102 to distal flange end 110, for example, at outer carrier side 100.

As shown best in FIG. 2, seal element 80 is positioned radially between seal carrier 72 and second support segment 92 and is connected to the seal carrier 72. Seal element 80, for example, is mated with (e.g., seated and/or press fit within) carrier sleeve 102 and abutted against retainer flange 114 at first carrier end 98. Seal element 80 extends axially from seal carrier 72 towards seal seat 66 and bearing assembly 38. Seal element 80 can be carbon face seal. Annular second seal element 116 is arranged radially between second support segment 92 and seal element 80 to reduce or prevent fluid leakage therebetween.

As shown best in FIG. 3a, seal carrier 72 is connected to seal support 70 by torque pins 78 and stopper collars 82. Torque pins 78 are arranged circumferentially around center axis CA and are circumferentially spaced from one another. Each torque pin 78 is connected to first support segment 90 and extends axially from first support segment 90 toward carrier flange 104. Slots 112 extend axially through carrier flange 104 and are circumferentially spaced and sized such that distal pin end 130 of each torque pin 78 can extend through one of slots 112. Stopper collars 82 connect torque pins 78 to carrier flange 92. As shown in FIG. 3a, one of stopper collars 82 is connected with a fastener (e.g., a cotter pin) to distal pin end 130 of each torque pin 78 on an aft side of carrier flange 104. Slots 112 of carrier flange 104 are large enough that seal carrier 72 is able to axially slide and translate on torque pins 78. Torque pins 78 also keep seal carrier 72 from rotating about center axis CA while seal seat 66, bearing inner race 132, and outer shaft 50 rotate during operation of gas turbine engine 20.

To keep seal element 80 engaged against seat seal surface 67 of seal seat 66, springs 74 are disposed axially between seal support 70 and carrier flange 104 to bias seal carrier 72 and seal element 80 aftward toward seal seat 66. Springs 74 push seal carrier 72 axially away from seal support 70 and, thus, bias seal element 80 axially against seal seat 66. Seal element 80 axially engages seat seal surface 67 of seal seat 66, thereby forming a gas and/or liquid seal therebetween.

Each of springs 74 extends axially between spring first end 118 and spring second end 120. As best shown in FIGS. 3a and 3b, springs 74 are respectively interposed between adjacent torque pins 78. Each spring 74 is connected by first end 118 to spring carrier 76. As shown best in FIGS. 2 and 3a, spring carrier 76 is positioned axially within seal assembly 62 between springs 74 and first support segment 90 of seal support 70. In the embodiment of FIGS. 2-3c, spring carrier 76 is in the form of annular disc 122. Bosses 124 (shown best in FIG. 3b) are formed on disc 122 and extend axially aft from disc 122. Axially extending cavity 126 (shown best in FIG. 3c) is formed in each of bosses 124 and is sized to receive first end 118 of springs 74. Hole 128 is formed in a bottom of each cavity 126 to connect first end 118 of spring 74 inside cavity 126.

When seal assembly 62 is assembled, first end 118 of spring 74 is inserted into cavity 126 and a portion of first end 118 is fed into hole 128. After being fed into hole 128, that portion of first end 118 of spring 74 is bent or deformed, thereby connecting spring 74 to spring carrier 76. After springs 74 are connected to spring carrier 76, spring carrier 76 is mounted and connected onto first support segment 90 of seal support 70. Torque pins 78 can extend through both spring carrier 76 and seal support 70 and can function similar to rivets to connect spring carrier 76 to seal support 70. With spring carrier 76 connected to seal support 70 and holding springs 74 in position, seal carrier 72 is assembled onto second support segment 92 of seal support 70 such that second end 120 of each spring 74 contacts carrier flange 104 of seal carrier 72. Second end 120 of each spring 74 can be connected to carrier flange 104 by spring pins 84 (shown in FIGS. 2 and 3a). Spring pins 84 extend axially through carrier flange 104 toward springs 74 and seal support 70 and can be riveted or otherwise fastened to carrier flange 104. Second end 120 of each spring 74 can be mated onto spring pins 84 to prevent second end 120 of each spring 74 from deflecting radially off of carrier flange 104. After seal assembly 62 is assembled together, seal assembly 62 is mounted onto bearing support 64, and bearing support 64 is mounted onto mid-turbine frame 58. Alternatively, seal support 70, along with spring carrier 76, springs 74, and torque pins 78, can be mounted onto bearing support 64, and bearing support 64 can be mounted onto mid-turbine frame 58 before seal carrier 72, along with seal element 80, is assembled to seal support 70. By waiting to assemble seal carrier 72 and seal element 80 to seal support 70 until after seal support 70 and bearing support 64 are connected to mid-turbine frame 58, an operator can use a torch to apply localized heat to second support segment 92 to get seal support 70 to expand and snap over front duct 69.

Figure 4:
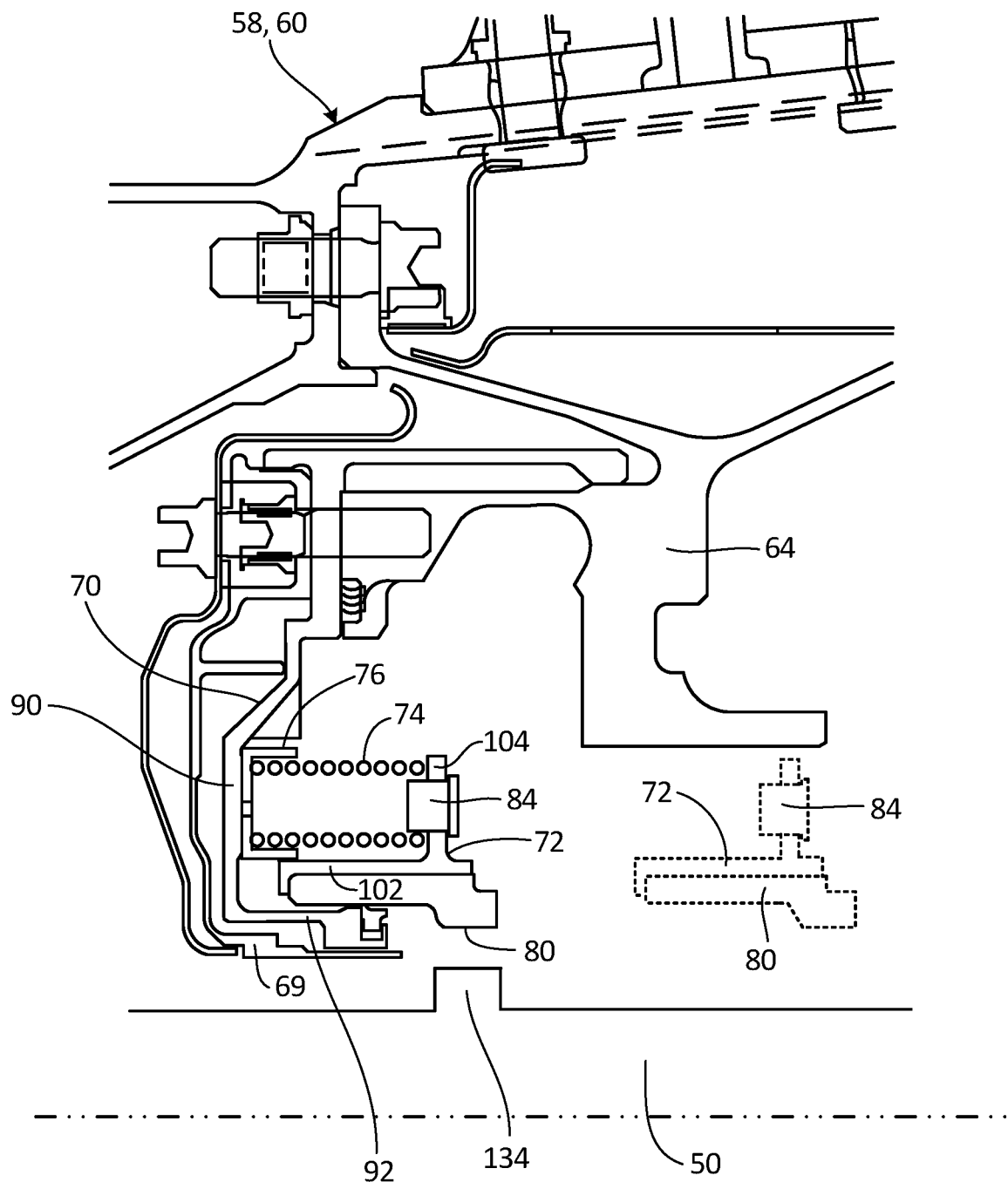
FIG. 4 is a cross-sectional view of the mid-turbine frame, the bearing support, and the seal assembly from FIG. 2 with the bearing assembly removed.

During the operational life of seal assembly 62, seal element 80 can become worn and require replacement. For conventional seal assemblies, the bearing assembly, the entire seal assembly, and the bearing support had to be removed from the gas turbine engine in order to replace the old seal element with a new seal element and to ensure that the springs were in their proper place before reassembly into the gas turbine engine. As shown in FIG. 4, bearing support 64 does not require removal to change seal element 80 in seal assembly 62.

FIG. 4 is a cross-sectional view of mid-turbine frame 58, bearing support 64, and seal assembly 62 from FIG. 2 with bearing assembly 38 and seal seat 66 removed (both shown in FIG. 2). As shown in FIG. 4, seal element 80 in seal assembly 62 can be accessed by an operator by simply removing bearing assembly 38 and seal seat 66. With bearing assembly 38 and seal seat 66 removed, an operator ran reach in and remove stopper collars 82 (shown in FIG. 3a), and pull seal carrier 72 and seal element 80 away from the rest of seal assembly 62. After the operator has replaced seal element 80 on seal carrier 72, the operator can slide seal carrier 72 back into position around second support segment 92 of seal support 70 and replace stopper collars 82 onto torque pins 78 (as shown in FIG. 3a). During this process, spring carrier 76 holds springs 74 in place, easing the procedure for the operator by ensuring that springs 74 do not shift position or fall and become lost inside gas turbine engine 20. As discussed below with reference to FIGS. 5a-6b, spring carrier can include multiple embodiments and should not be limited by the above description.

Figure 5B:
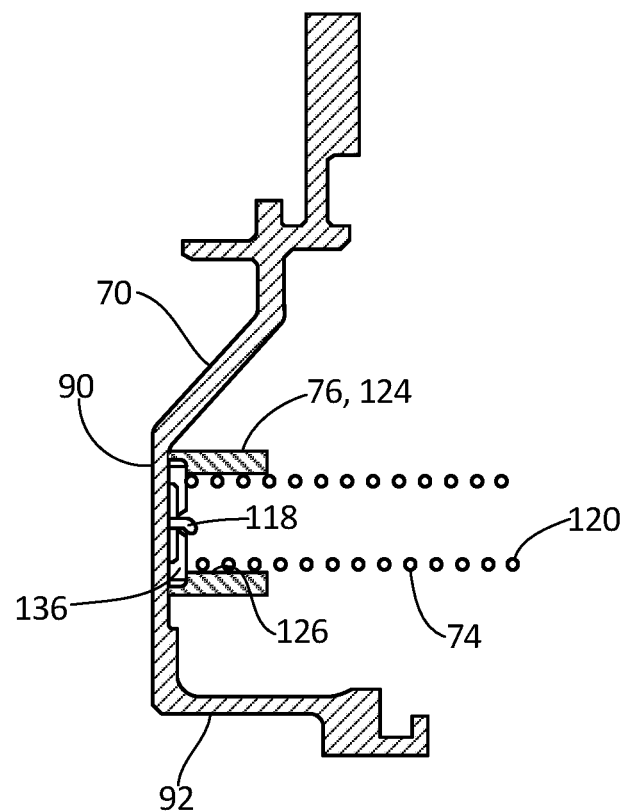
FIG. 5b is a cross-sectional view of the spring carrier and the spring from FIG. 5a connected to a seal support.
Figure 5A:
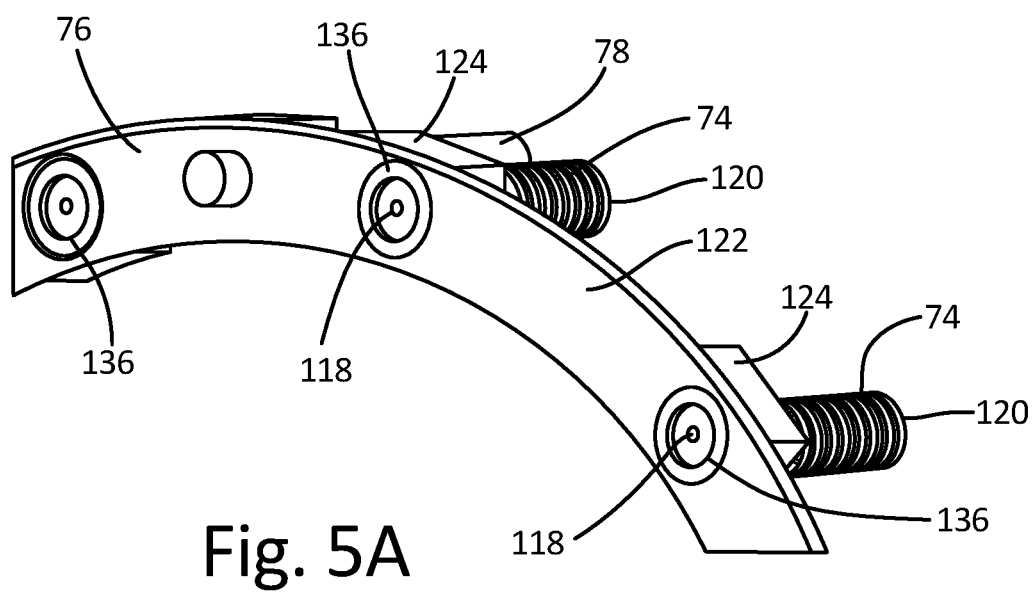
FIG. 5a is a perspective view of another embodiment of a spring carrier.

FIGS. 5a and 5b will be discussed concurrently. FIG. 5a is a perspective view of another embodiment of spring carrier 76 for springs 74, and FIG. 5b is a cross-sectional view of spring carrier 76 from FIG. 5a connected to seal support 70. As shown in FIGS. 5a and 5b, cavities 126 can be bore holes that extend completely through disc 122 and bosses 124 of spring carrier 76. First end 118 of each spring 74 is inserted through one of cavities 126 respectively and is connected to one of plates 136 respectively. Plates 136 are larger in diameter than cavities 126 to prevent first ends 118 of springs 74 from being pulled out of cavities 126 once attached to plates 136. After spring carrier 76 is attached to seal support 70 by torque pins 78 (one of which is shown in FIG. 5b), plates 136 are disposed axially between first support segment 90 of seal support 70 and disc 122 of spring carrier 76.

Figure 6B:
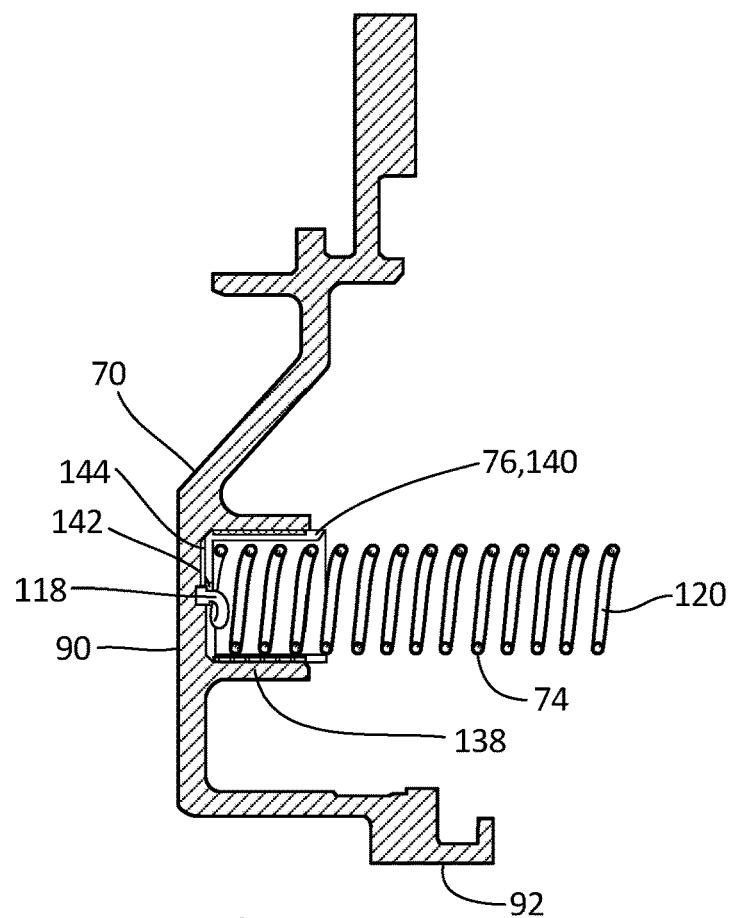
Figure 6A:
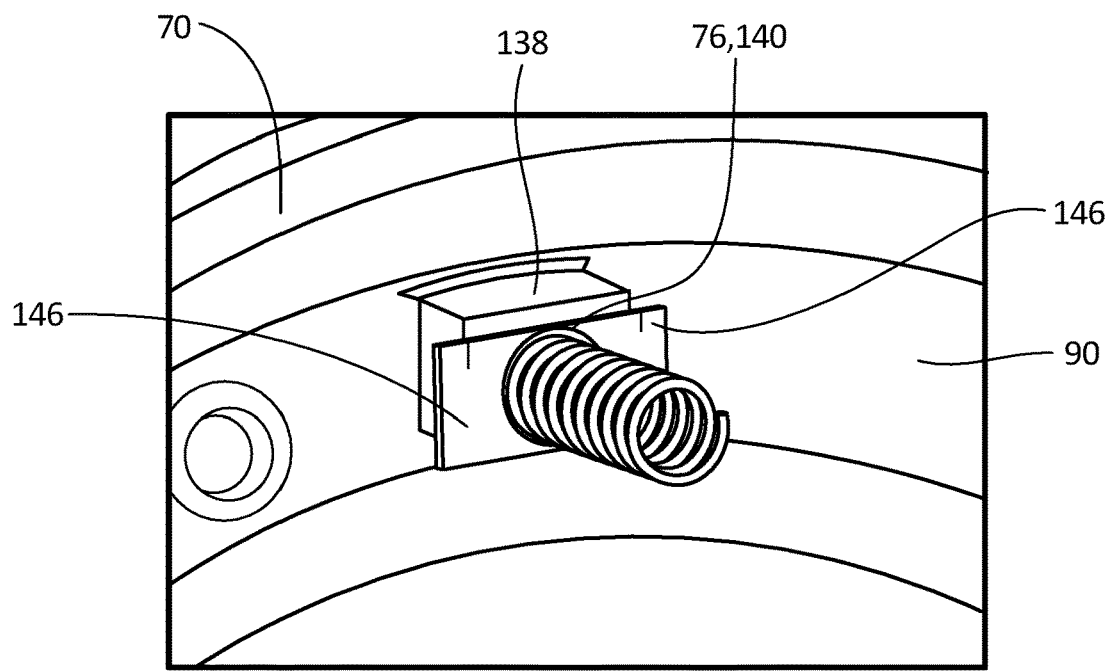
FIG. 6a is a perspective view of another embodiment of a seal support, a spring carrier, and a spring.

FIGS. 6a and 6b will be discussed concurrently. FIG. 6a is a perspective view of another embodiment of seal support 70, spring carrier 76, and springs 74. FIG. 6b is a cross-sectional view of seal support 70, spring carrier 76, and spring 74 from FIG. 6a. As shown in FIGS. 6a and 6b, seal support 70 includes a plurality of seats 138 (only one of which is shown in FIGS. 6a and 6b) that extend axially from first support segment 90 of seal support 70. Spring carrier 76 includes a plurality of cups 140 (only one of which is shown in FIGS. 6a and 6b). First end 118 of each spring 74 is inserted into one of cups 140. Hole 142 is formed in a bottom of each of cups 140 respectively. First end 118 of each spring 74 is fed through hole 142 and bent or deformed to attach springs 74 to cups 140. After spring 74 is attached to cup 140, cup 140 is press-fitted into seat 138 of seal support 70. Gap 144 can exist between the bottom of cup 140 and a bottom of seat 138 to accommodate the bent or deformed portion of spring 74. Each cup 140 can include tabs 146 at or proximate an opening of cup 140. Tabs 146 can be used by an operator for grip to remove cup 140 from seat 138 in the event spring 74 requires replacement. Tabs 146 can also be bent after cup 140 is installed in seat 138 to prevent rotation of cup 140 relative seat 138.

In view of the foregoing description, it will be recognized that the present disclosure provides numerous advantages and benefits. For example, the present disclosure provides spring carrier 76 that connects springs 74 to seal support 70. Because spring carrier 76 connects springs 74 to seal support 70, an operator can remove and replace seal carrier 72 and seal element 80 in fewer steps than conventional designs without worrying about springs 74 falling and becoming lost inside gas turbine engine 20.

The following are non-exclusive descriptions of possible embodiments of the present invention.

In one embodiment, a seal assembly for a turbine engine extends along a center axis and includes an annular seal support arranged circumferentially around the center axis. An annular seal carrier is arranged circumferentially around the center axis, and an annular seal is connected to the seal carrier and arranged circumferentially around the center axis. A spring is disposed between the annular seal support and the annular seal carrier. A spring carrier is disposed between the spring and the annular seal support. A first end of the spring is connected to the spring carrier and the spring carrier is connected to the annular seal support.

The seal assembly of the preceding paragraph can optionally include, additionally and/or alternatively, any one or more of the following features, configurations and/or additional components:

the spring comprises a second end disposed opposite the first end of the spring, and wherein the second end of the spring contacts the annular seal carrier;

the annular seal carrier comprises a spring pin that extends axially toward the annular seal support, and wherein the second end of the spring is disposed around the spring pin;

the seal assembly comprises a torque pin extending axially from the annular seal support toward the annular seal carrier, wherein the torque pin extends through a slot formed in the annular seal carrier;

the torque pin connects the spring carrier to the annular seal support;

the spring carrier comprises a hole and the first end of the spring extends through the hole;

the spring carrier is annular and a plurality of springs are connected to the spring carrier;

the annular seal support comprises a seat, wherein the spring carrier is press fitted to the seat of the annular seal support; and/or the spring carrier is a cup and the first end of the spring is disposed inside the cup and connected to a bottom of the cup.

In another embodiment, a gas turbine engine includes a mid-turbine frame arranged circumferentially around a center axis of the gas turbine engine. A bearing support is disposed radially inward from the mid-turbine frame and is connected to the mid-turbine frame. A bearing assembly is disposed radially inward of the bearing support. The gas turbine engine also includes a seal assembly. The seal assembly includes an annular seal support that is arranged circumferentially around the center axis and connected to the bearing support. An annular seal carrier is arranged circumferentially around the center axis and positioned axially between the annular seal support and the bearing assembly. An annular seal is connected to the seal carrier. The annular seal extends from the annular seal carrier towards the bearing assembly. A spring is disposed between the annular seal support and the annular seal carrier. A spring carrier is disposed between the spring and the annular seal support. A first end of the spring is connected to the spring carrier, and the spring carrier is connected to the annular seal support.

The gas turbine engine of the preceding paragraph can optionally include, additionally and/or alternatively, any one or more of the following features, configurations and/or additional components:

the spring carrier is annular and comprises a hole and the first end of the spring extends through the hole;

the first end of the spring is connected to a plate, wherein the plate is larger in diameter than the hole of the spring carrier, and wherein the plate is disposed axially between the spring carrier and the annular seal support; and/or the seal assembly comprises a torque pin extending axially from the annular seal support toward the annular seal carrier, wherein the torque pin extends through a slot formed in the annular seal carrier, wherein the torque pin extends through the spring carrier and into the annular seal support to connect the spring carrier to the annular seal support.

In another embodiment, a seal assembly for a turbine engine extends along a center axis and includes a seal support and a seal carrier configured to translate relative the seal support. A seal is connected to the seal carrier and a spring is disposed between the seal support and the seal carrier. A spring carrier is disposed between the spring and the seal support. A first end of the spring is connected to the spring carrier and the spring carrier is connected to the seal support. The spring includes a second end disposed opposite the first end of the spring. The second end of the spring contacts the annular seal carrier.

The seal assembly of the preceding paragraph can optionally include, additionally and/or alternatively, any one or more of the following features, configurations and/or additional components:

the spring carrier comprises a hole and the first end of the spring extends through the hole;

the spring carrier is annular and a plurality of springs are connected to the spring carrier;

the seal support comprises a seat, wherein the spring carrier is press fitted to the seat of the seal support;

the spring carrier is a cup and the first end of the spring is disposed inside the cup and connected to a bottom of the cup;

a gap is formed between the bottom of the cup and a bottom of the seat of the seal support; and/or the cup of the spring carrier is connected to a flange proximate an opening of the cup, and wherein a portion of the flange is bent to prevent rotation of the cup relative the seal support.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for a turbine engine, the seal assembly extending in an axial direction along a center axis and comprising:
   an annular seal support arranged circumferentially around the center axis;
   an annular seal carrier arranged circumferentially around the center axis;
   an annular seal connected to the annular seal carrier and arranged circumferentially around the center axis;
   a spring disposed in the axial direction between the annular seal support and the annular seal carrier, wherein the spring extends axially between the annular seal support and the annular seal carrier relative to the center axis;
   a spring carrier disposed between the spring and the annular seal support, wherein the spring carrier is connected to the annular seal support; and
   a plate stacked in the axial direction between the spring carrier and the annular seal support, wherein:
      a first end of the spring is connected to the plate;
      the plate is larger in diameter than a hole of the spring carrier;
      the plate is disposed axially between the hole of the spring carrier and the annular seal support in the axial direction; and
      the first end of the spring extends through the hole.

2. The seal assembly of claim 1, wherein the spring comprises a second end disposed opposite the first end of the spring, and wherein the second end of the spring contacts the annular seal carrier.

3. The seal assembly of claim 2, wherein the annular seal carrier comprises a spring pin that extends axially toward the annular seal support, and wherein the second end of the spring is disposed around the spring pin.

4. The seal assembly of claim 1, wherein the seal assembly comprises a torque pin extending axially from the annular seal support toward the annular seal carrier, wherein the torque pin extends through a slot formed in the annular seal carrier.

5. The seal assembly of claim 4, wherein the torque pin connects the spring carrier to the annular seal support.

6. The seal assembly of claim 5, wherein the spring carrier is annular and a plurality of springs are connected to the spring carrier.

7. A gas turbine engine comprising:
   a mid-turbine frame arranged circumferentially around a center axis of the gas turbine engine;
   a bearing support disposed radially inward from the mid-turbine frame and connected to the mid-turbine frame;
   a bearing assembly disposed radially inward of the bearing support; and
   a seal assembly, the seal assembly comprising:
      an annular seal support arranged circumferentially around the center axis, wherein the annular seal support is connected to the bearing support;
      an annular seal carrier arranged circumferentially around the center axis and positioned axially between the annular seal support and the bearing assembly relative to the center axis;
      an annular seal connected to the annular seal carrier, wherein the annular seal extends in an axial direction along the center axis from the annular seal carrier towards the bearing assembly;
      a spring disposed between the annular seal support and the annular seal carrier, wherein the spring extends in the axial direction between the annular seal support and the annular seal carrier;
      a spring carrier disposed between the spring and the annular seal support, wherein the spring carrier is annular and comprises a hole, wherein a first end of the spring extends through the hole, and the spring carrier is connected to the annular seal support; and
      a plate stacked in the axial direction between the spring carrier and the annular seal support, wherein the first end of the spring is connected to the plate and the plate is larger in diameter than the hole of the spring carrier.

8. The seal assembly of claim 7, wherein the seal assembly comprises a torque pin extending axially from the annular seal support toward the annular seal carrier, wherein the torque pin extends through a slot formed in the annular seal carrier, wherein the torque pin extends through the spring carrier and into the annular seal support to connect the spring carrier to the annular seal support.

9. A seal assembly for a turbine engine, the seal assembly extending in an axial direction along a center axis and comprising:
   a seal support;
   a seal carrier configured to translate relative the seal support;
   a seal connected to the seal carrier;
   a spring disposed between the seal support and the seal carrier, wherein the spring extends in the axial direction between the seal support and the seal carrier relative to the center axis;
   a spring carrier disposed between the spring and the seal support, wherein the spring carrier is connected to the seal support; and
   a plate sandwiched between the spring carrier and the seal support in the axial direction, wherein:

a first end of the spring is connected to the plate, and the plate is larger in diameter than a hole in the spring carrier;
the spring comprises a second end opposite the first end of the spring, and wherein the second end of the spring contacts the seal carrier; and
the first end of the spring extends through the hole.

10. The seal assembly of claim 9, wherein the spring carrier is annular and a plurality of springs are connected to the spring carrier.

* * * * *